United States Patent
Okamoto et al.

(10) Patent No.: US 7,434,828 B2
(45) Date of Patent: Oct. 14, 2008

(54) MOLDED MEMBER WITH FOAMED BODY

(75) Inventors: Shinji Okamoto, Anjo (JP); Hiroshi Suzuki, Anjo (JP); Tomohiro Chiba, Anjo (JP)

(73) Assignee: Inoac Corporation, Aichi (JP)

( * ) Notice: Subject to any disclaimer, the term of this patent is extended or adjusted under 35 U.S.C. 154(b) by 291 days.

(21) Appl. No.: 11/086,190

(22) Filed: Mar. 22, 2005

(65) Prior Publication Data

US 2006/0214399 A1  Sep. 28, 2006

(51) Int. Cl.
B60R 21/20 (2006.01)
(52) U.S. Cl. .................................. 280/728.3
(58) Field of Classification Search .............. 280/728.3, 280/732
See application file for complete search history.

(56) References Cited

U.S. PATENT DOCUMENTS

| | | | | |
|---|---|---|---|---|
| 6,152,480 | A * | 11/2000 | Iwanaga | 280/728.3 |
| 6,250,669 | B1 * | 6/2001 | Ohmiya | 280/732 |
| 6,406,056 | B2 * | 6/2002 | Yokota | 280/728.2 |
| 6,726,239 | B1 * | 4/2004 | Teranishi et al. | 280/728.3 |

FOREIGN PATENT DOCUMENTS

| | | |
|---|---|---|
| JP | 10-169711 | 6/1998 |
| JP | 10-211831 | 8/1998 |
| JP | 11-151728 | 6/1999 |
| JP | 11-198751 | 7/1999 |
| JP | 2001-88646 | 4/2001 |
| JP | 2001-158318 | 6/2001 |
| JP | 2005008057 A * | 1/2005 |

* cited by examiner

Primary Examiner—Christopher Ellis
Assistant Examiner—Robert A. Coker
(74) Attorney, Agent, or Firm—William L. Androlia; H. Henry Koda

(57) ABSTRACT

Disclosed is a molded member with a foamed body, which is foamed on the top surface sides of a first member and a second member and is prevented from leaking from between abutment surfaces of those members toward the back side. A seal piece of a required width extending in an eaves form outward over the perimeter of the outer contour edge of an airbag door is provided at the outer contour edge. When the airbag door is laid out at a door mount portion, so formed as to surround an opening formed in a base material, the seal piece is set in close contact with the outer surface of the door mount portion in such a way as to surround the opening. This prevents the foamed body, foamed on the top surface side of the base material facing the airbag door, from leaking from a clearance, produced between abutment surface of the base material and the airbag door, toward the back side.

3 Claims, 10 Drawing Sheets

(a)

(b)

MOLDED MEMBER WITH FOAMED BODY

FIELD OF THE INVENTION

The present invention relates to a molded member with a foamed body, and, more particularly, to a molded member comprising a first member having an opening of a required shape formed therein, a second member provided on the top surface side of the first member to completely cover the opening, and a foamed body foamed between the top surface sides of the first and second members and provided in close contact with both members.

DESCRIPTION OF THE RELATED ART

One example of a so-called "molded member with a foamed body", which has a member molded into a required shape and a foamed body foamed on the top surface side of the member and provided in close contact with the member is an instrument panel as an upholstered member of a vehicle as exemplified in FIGS. 8 and 9. The illustrated instrument panel has a 3-layer structure where a skin is laid out on the outer surface of a foamed body, provided in close contact with a base material as a member, in such a way as to cover the foamed body, and the foamed body is foamed to a required thickness between the base material and the skin.

The instrument panel is attached to the front side of a passenger compartment while an airbag system mounted to the front side of the passenger compartment as a safety device for a person on a front passenger is upholstered on (covered at) the back of the instrument panel. Accordingly, an airbag door which opens and permits development of the air bag upon activation of the airbag system is provided at the required portion of the base material (portion corresponding to the airbag system). The airbag door is covered with the foamed body and the skin and is of an "invisible type" which cannot be seen from outside the instrument panel. Such invisible instrument panels are classified into (i) a base-integrated type which is formed integral with the base material and always constitutes a part of the base material, and (ii) a base-separate type which is mounted to an opening as an airbag insertion opening provided in the base material. The example shown in FIGS. 8 and 9 is the type (ii). FIG. 8 shows a four-way open type airbag door which has a to-be-broken part with the shape of a double "Y" provided at the back and whose four door panels split by breaking of the to-be-broken part opening right and left and forward and backward.

To secure the required rigidity and strength of the instrument panel, the base material is formed of a material obtained by mixing an adequate reinforcing material into a synthetic resin material, such as PP or ASG, and is thus relatively hard with a low toughness. Therefore, the airbag door of the type (i) may break when the extensive force of the air bag is applied, and requires that a metal or resin insert member (door reinforcing member) should be attached to the back of the door for reinforcement. In this respect, therefore, in recent years, an airbag door of the type (ii) which can be formed of a synthetic resin material excellent in flexibility and toughness, such as TPO (olefin series thermoplastic elastomer), is adopted preferably.

As shown in FIGS. 10 and 11, the outer size of the airbag door is set larger than the opening, so that as the door is mounted to the door mount portion formed around the opening from the top surface side of the base material, it completely covers the opening. Specifically, as a door attaching portion provided at the outer contour portion and a stopper claw protruding from the side of the support frame portion formed at the back of the door are engaged with each other, sandwiching the door mount portion from the top and back sides, the door is secured to the base material while completely covering the opening. That is, pressing the support frame portion into the opening secures the airbag door to the base material at which time the door attaching portion of the airbag door and the door mount portion overlie each other at a required distance (e.g., about 1 cm). The technique relating to attachment of such an airbag door is disclosed in, for example, Japanese Unexamined Patent Publication No. 2001-88646.

Being a molded member of a synthetic resin, both the base material (first member) and the airbag door (second member) are likely to suffer molding deformation and thermal deformation. When the airbag door is attached to the base material, therefore, a clearance may be produced between the abutment surfaces of both members. When the foamed body is foamed on the top surface sides of the base material and the airbag door, therefore, a part of the foamed body whose foaming reaction is in progress enters the clearance produced between the abutment surfaces of both members and leaks to the back side of the base material through the opening. When such leakage of the foamed body occurs, the foamed body is hardened while the corresponding portions of the skin exposed outside are deformed in recess shapes as exemplified by two-dot chain lines in FIG. 10. This undesirably degrades the texture of the instrument panel.

As a solution to avoid the inconvenience, a tape-like seal member formed of an elastic material, such as urethane, is adhered to either the outer surface of the door mount portion of the base material or the back side of the door attaching portion of the airbag door, after which the airbag door is mounted to the base material, as shown in FIG. 12. The use of such a seal member provides the adequate sealed state with the seal member intervening between the abutment surfaces of the door attaching portion of the airbag door and the door mount portion of the base material, and thus prevents the foamed body, foamed on the top surface sides of the base material and the airbag door, from leaking toward the back side. This method however brings about an additional problem of an increased manufacture cost due to, for example, (a) the cost of the material for the seal member and (b) increases in the number of work steps and work time for laying the seal member.

As shown in FIG. 13, the abutment surface (parting line) of the airbag door, which is molded using an injection mold comprising a first mold and a second mold, when closing both molds is positioned along the lower edge of the outer contour edge of the door attaching portion of the airbag door. When abrasion of the molds, inadequate closing of both molds or the like occurs, a small clearance is produced between the abutment surfaces of the closed molds, so that when a resin material enters the clearance and is hardened, a thin burr is locally or entirely formed along the lower edge of the outer contour edge. After completion of injection molding, therefore, the step of cutting off the burr (process prior to molding of the foamed body) is needed, which leads to an increase in manufacture cost.

SUMMARY OF THE INVENTION

Accordingly, it is an objective of the invention to provide a molded member with a foamed body, which can prevent leakage of the foamed body, foamed on the top surface sides of a first member and a second member, by adequately providing the sealed state of the first member and the second member to be mounted to the first member.

To achieve the object, according to the invention, there is provided a molded member with a foamed body, comprising a first member with an opening of a required shape; a second member provided on a top surface side of the first member to completely cover the opening; a foamed body foamed on top surface sides of the first member and the second member and provided in close contact with the first and second members; and a seal piece of a required width provided at an outer contour edge of the second member and extending outward over a perimeter thereof in an eaves form, wherein as the seal piece is set in close contact with that outer surface of the first member which surrounds the opening of the first member when the second member is laid out at the first member, the foamed body is prevented from leaking from a clearance, produced between abutment surfaces of the first and second members, toward a back side when the foamed body is foamed.

DETAILED DESCRIPTION OF THE PREFERRED EMBODIMENT

A preferred embodiment of a molded member with a foamed body according to the invention will now be described referring to the accompanying drawings.

Figure 8:
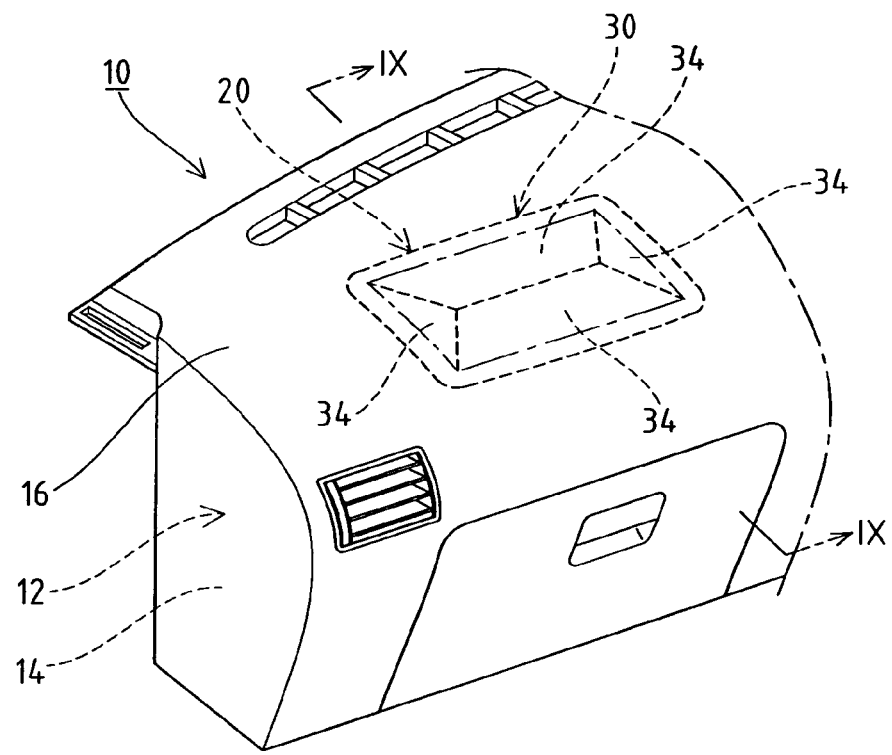
FIG. 8 is a partial perspective view of an instrument panel exemplified as a molded member with a foamed body.
Figure 9:
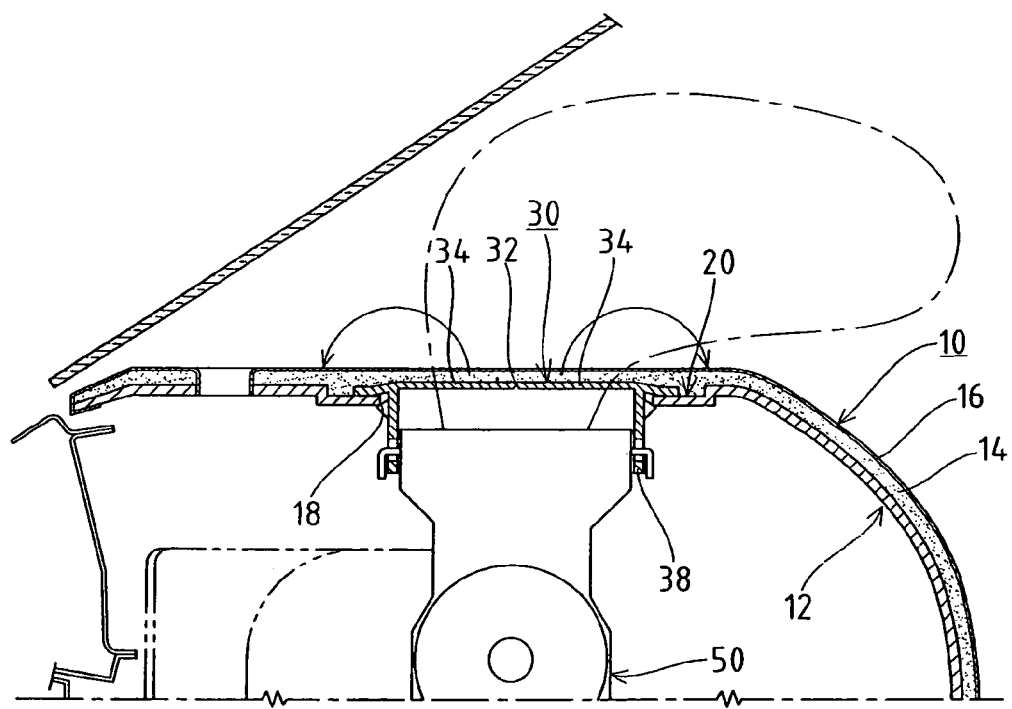
FIG. 9 is a cross-sectional view of the instrument panel taken along the line IX-IX in FIG. 8.

As mentioned earlier, the "molded member with a foamed body" as defined in the present application is premised on that the molded member has a member molded into a required shape and a foamed body foamed on the top surface side of the member and provided in close contact with the member and comprises a first member with an opening of a required shape and a second member provided on the top surface side of the first member to completely cover the opening. Because one example of such a molded member with a foamed body is an instrument panel as exemplified in, for example, FIGS. 8 and 9, the following description of the embodiment will be given referring to the instrument panel. Accordingly, those members and portions which are identical to those of the prior art explained already are denoted by the same reference numerals.

Figure 1:
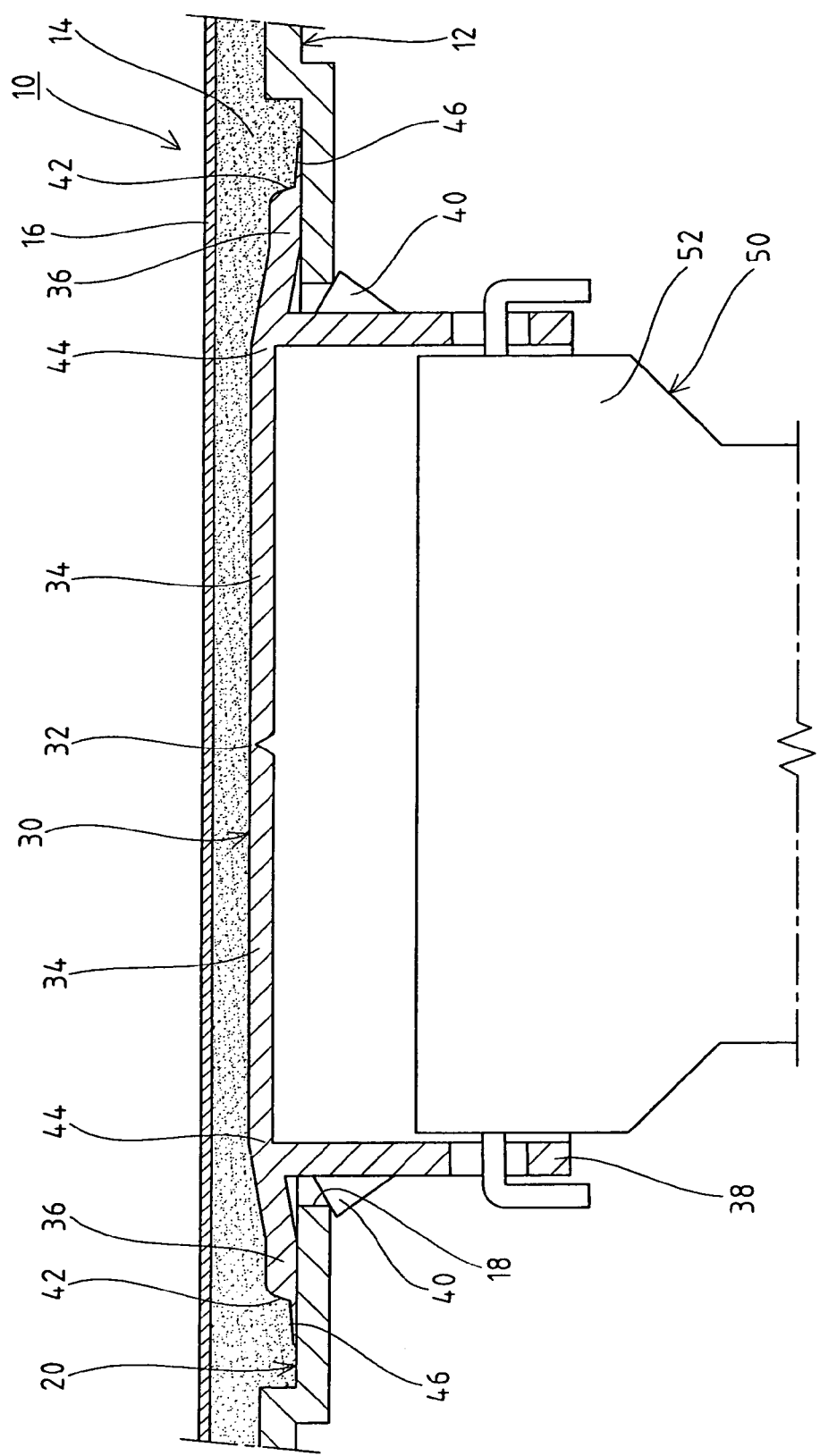
FIG. 1 is a partly side cross-sectional view showing an instrument panel as a molded member with a foamed body according to a preferred embodiment of the invention, cut away at a portion corresponding to the layout position of an airbag system.
Figure 10:
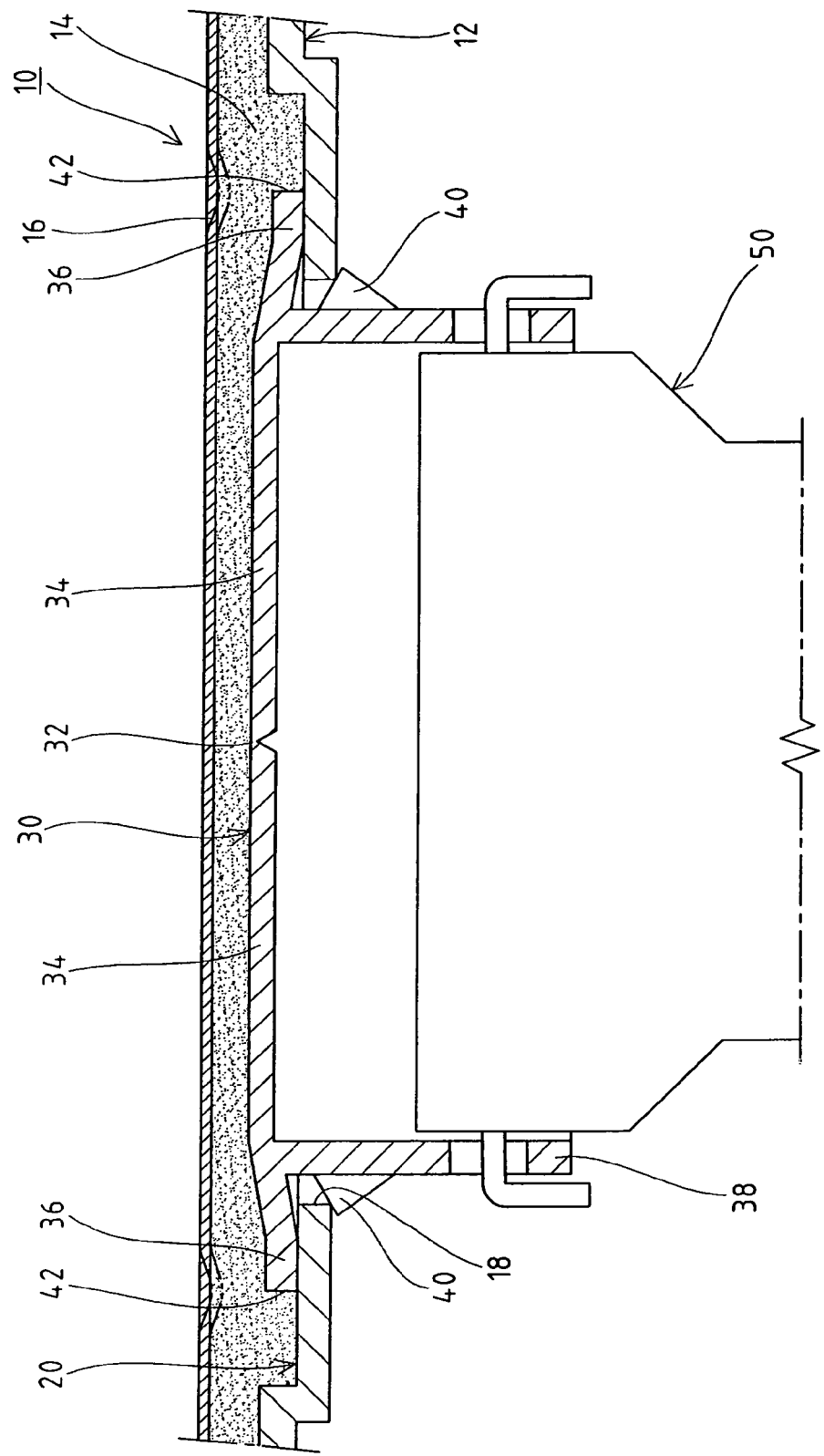
FIG. 10 is a partly enlarged view of the instrument panel in FIG. 9.
Figure 11:
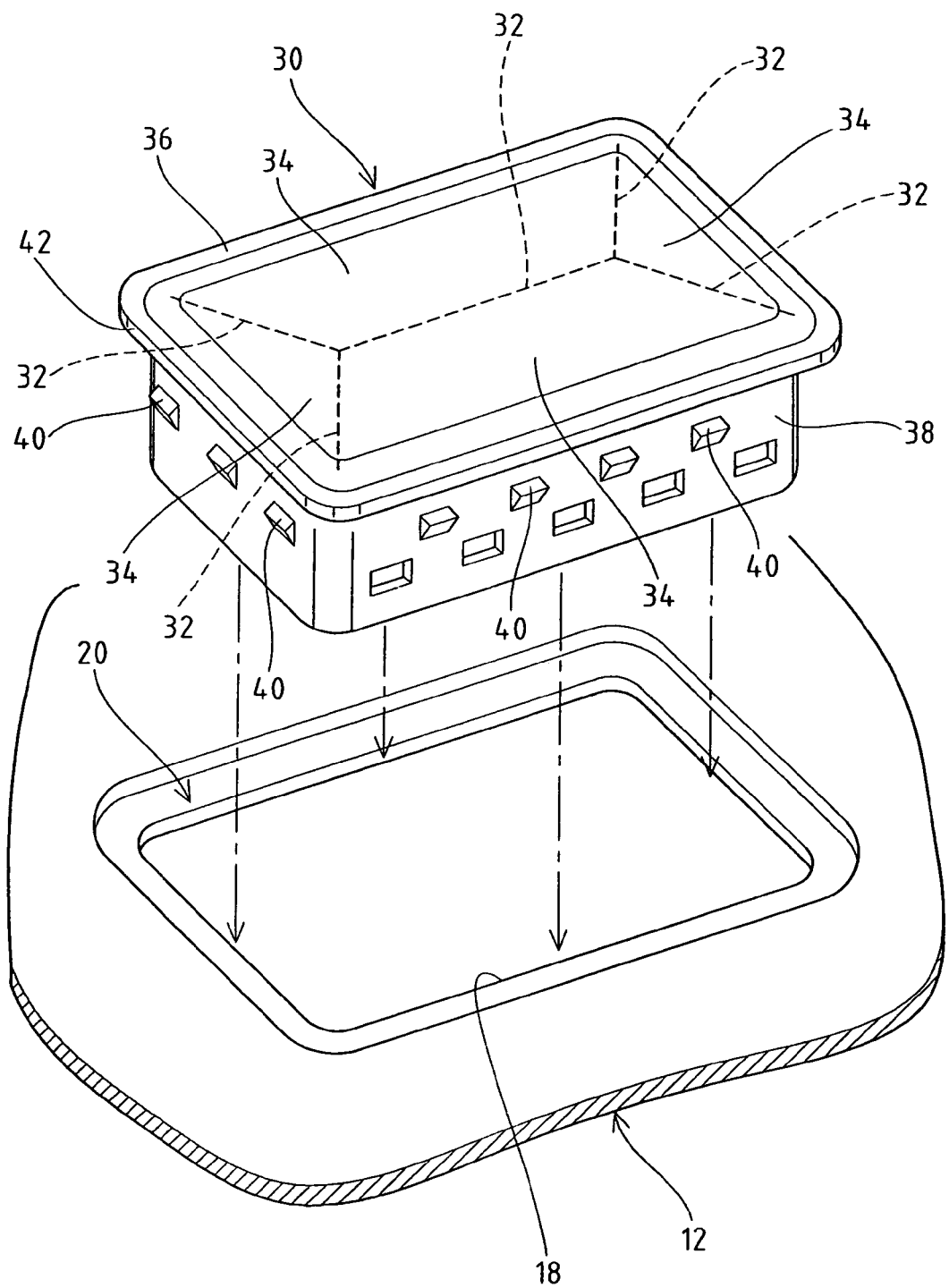
FIG. 11 is a schematic perspective view showing mounting of a conventional airbag door to a door mount portion formed in such a way as to surround an opening formed in a base material.

FIG. 1 is a partly side cross-sectional view showing an instrument panel as a molded member with a foamed body according to the preferred embodiment, cut away at a portion corresponding to the layout position of an airbag system. An instrument panel 10 of the embodiment has the same basic structure as the one shown in FIG. 10, and has a base material 12 as a first member having an opening 18 formed in an approximately rectangular shape and serving as an airbag insertion opening, an airbag door 30 as a second member which is laid on the top surface side of the base material 12 to completely cover the opening 18, and a foamed body 14 foamed on the top surface sides of the base material 12 and the airbag door 30 and provided in close contact with both members 12 and 30. A skin 16 is laid out on the outer surface of the foamed body 14 in such a way as to cover the foamed body 14, thereby achieving a 3-layer structure comprising the base material 12 to which the airbag door 30 is mounted, the foamed body 14 and the skin 16.

Figure 2:
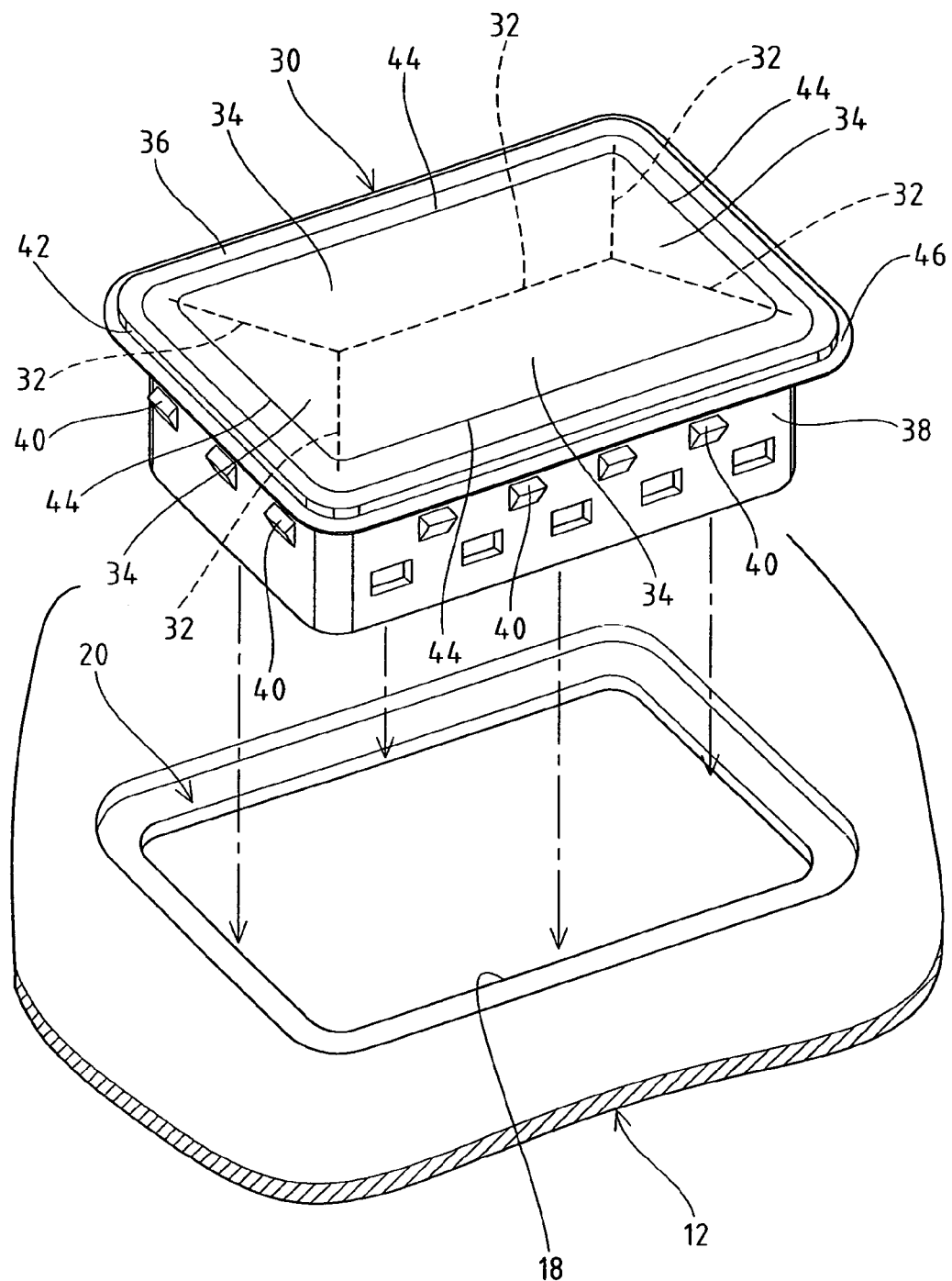
FIG. 2 is a schematic perspective view showing mounting of an airbag door having a seal piece provided at the outer contour edge to a door mount portion formed in such a way as to surround an opening formed in a base material.

The base material 12 is a relatively hard injection-molded member of a synthetic resin material, such as PP (polypropylene) or ASQ and its peripheral portion which surrounds the opening 18 of an approximately square shape formed in the base material 12 is a door mount portion 20 for mounting the airbag door 30 formed as a separate member (FIG. 2). The door mount portion 20 is recessed like a step stepped down by one from the outer surface of the base material 12, and is designed in such a way that the outer surface of the airbag door 30 becomes approximately in level with the outer surface of the base material 12 when the airbag door 30 is mounted to the door mount portion 20. The door mount portion 20 is formed in an approximately rectangular shape larger than the outer size of the airbag door 30.

The airbag door 30 is an injection-molded member of a synthetic resin material excellent in flexibility and toughness, such as TPO (olefin series thermoplastic elastomer), so that it is not easily broken by excessive impact force applied by the air bag of an airbag system 50. The airbag door 30 has an approximately rectangular outer contour shape larger than the size of the opening 18 and smaller than the inner peripheral edge of the door mount portion 20, and the outer contour portion that overlies and abuts on the door mount portion 20 serves as a door attaching portion 36. Although the illustrated airbag door in the embodiment is of a four-way open type where when a to-be-broken part 32 with the shape of a double "Y" provided at the back is broken, four split door panels 34 open right and left and forward and backward, the airbag door can be worked out as a 2-way open type or a one-way open type by changing the extending shape of the to-be-broken part 32 (to an H shape or an inverted square C shape).

A support frame portion 38 of a square cylindrical shape, which corresponds to the boundary portion of the door panels 34 and the door attaching portion 36 and can be fitted in the opening 18, is formed integrally at the back of the airbag door 30. The support frame portion 38 serves to couple the airbag door 30 mounted to the base material 12 to a case body 52 of the airbag system 50 to support the airbag door 30 at the airbag system 50. Therefore, each of the door panels 34 pressed against the air bag is displaced and opened outward of the instrument panel 10 while being supported on the airbag system 50 with a boundary portion 44 to the support frame portion 38 as a hinge point. A plurality of stopper claws 40 which are engaged with the back of the door mount portion 20 are formed in a line and integral with the outer wall portion of the support frame portion 38.

Figure 3:
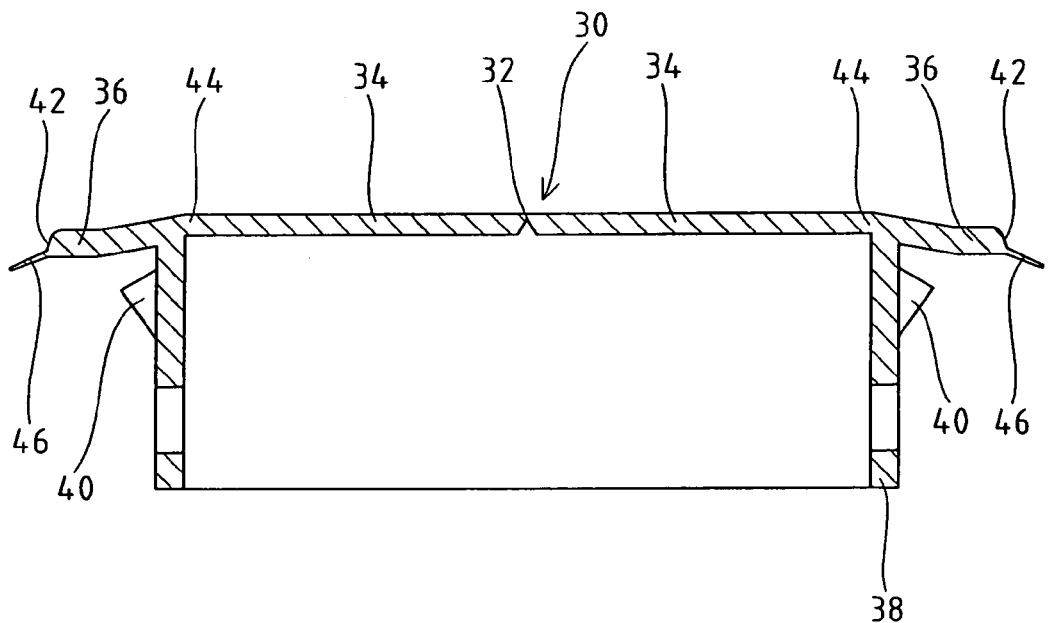
FIG. 3 is a side cross-sectional view of the airbag door.

A seal piece 46 of a required width extending outward over the perimeter in an eaves form is provided at an outer contour edge 42 of the door attaching portion 36 constituting the airbag door 30 of the embodiment, as exemplified in FIGS. 1 to 3. The seal piece 46 is set in close contact with the outer surface of the base material 12 which surrounds the opening 18 or the outer surface of the door mount portion 20 when the airbag door 30 is mounted to the door mount portion 20 provided at the base material 12. Accordingly, the seal piece 46 is provided to prevent the foamed body 14 at the time of being foamed from leaking from a clearance, produced between abutment surfaces of the door mount portion 20 of the base material 12 and the door attaching portion 36 of the airbag door 30, toward the back side.

Figure 4:
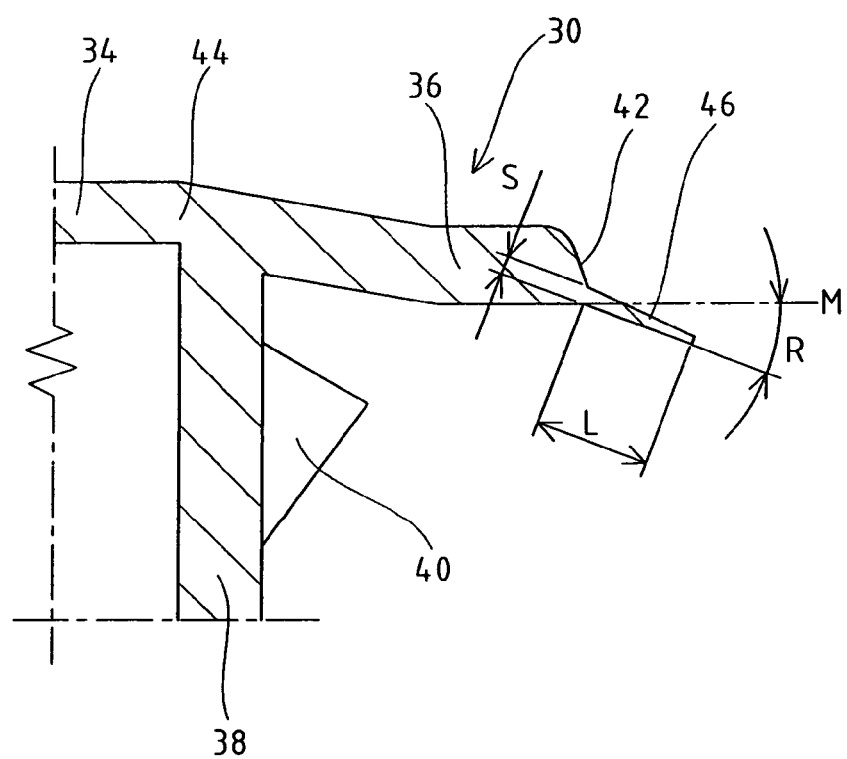
FIG. 4 is a partly enlarged view of the airbag door in FIG. 3.

As shown in enlargement in FIG. 4, the seal piece 46 is formed in such a way as to have an extending length (width) L=about 10 mm from the proximal end and a thickness S of the proximal end of about 0.5 mm and become gradually thinner toward the distal end from the proximal end, and has a shape of the so-called thin knife as a whole. In addition, as the seal piece 46 is formed integral with the airbag door 30 of TPO, the seal piece 46 is so flexible to be permitted for partial flexing or bending deformation. The thickness S and the extending length L of the seal piece 46 are not limited to the aforementioned sizes.

Figure 5:
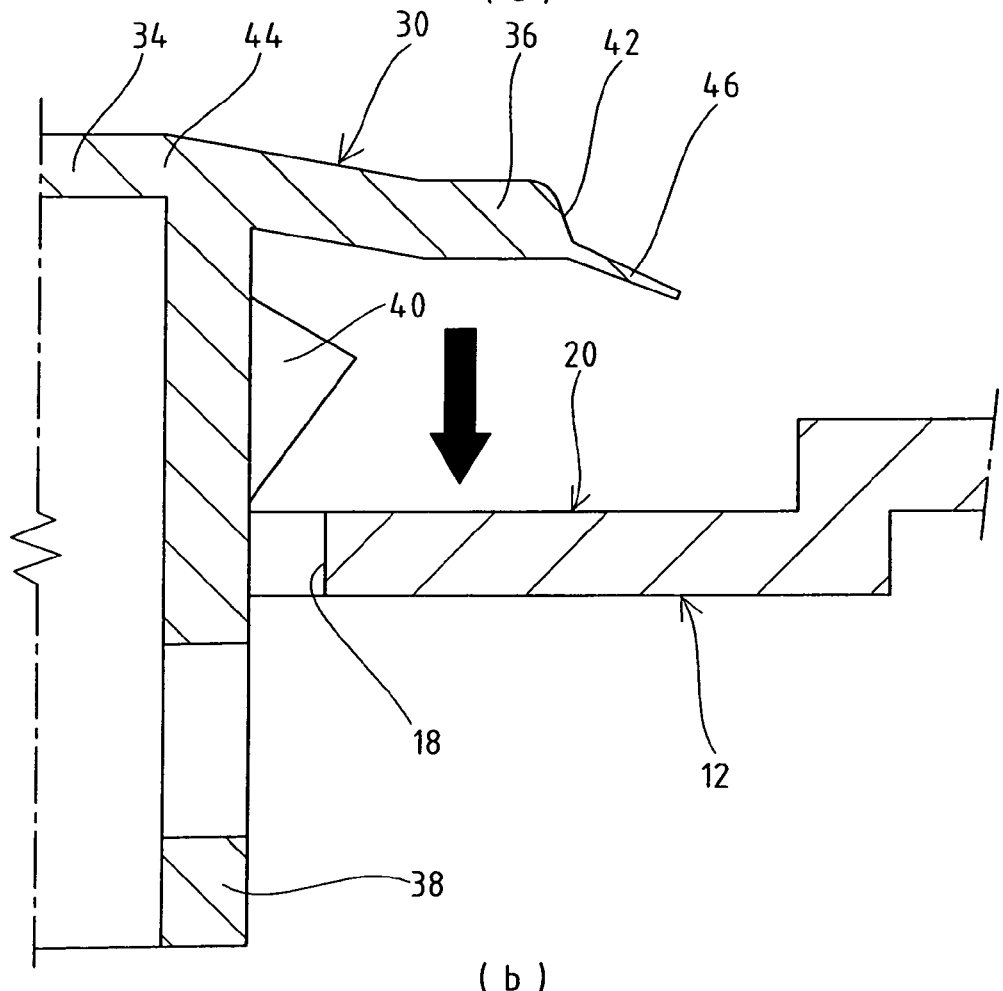
FIG. 5A is an explanatory cross-sectional view showing mounting of the airbag door having the seal piece provided at the outer contour edge to the door mount portion formed in such a way as to surround the opening formed in the base material.
FIG. 5B is an explanatory cross-sectional view showing the airbag door mounted to the door mount portion.
Figure 5:
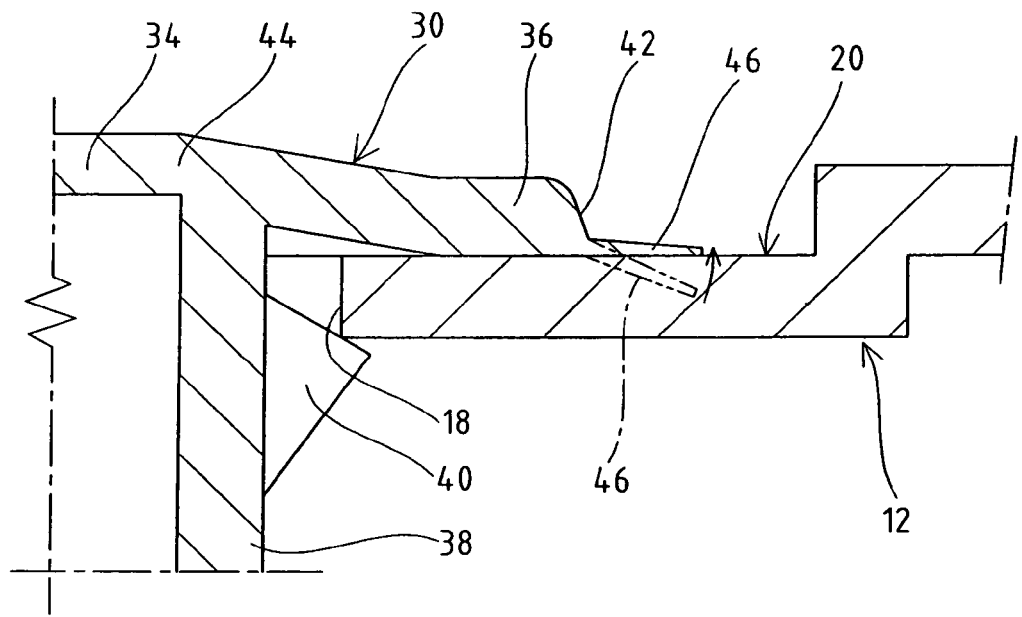

Further, the seal piece 46 is formed extending and inclined downward at an inclination angle R=15 to 20° with respect to an extension line M toward the abutment surface of the airbag door 30. Accordingly, the seal piece 46 comes in contact with the outer surface of the door mount portion 20 when the airbag door 30 is laid at the door mount portion 20, and the seal piece 46 in contact with the door mount portion 20 is pressed in such a direction as to be closer to the extension line M and is flexed or bent, as shown in FIGS. 5A and 5B. That is, with the airbag door 30 completely mounted to the door mount portion 20 with the door attaching portion 36 engaged with the stopper claws 40, the seal piece 46 closely contacts the outer surface of the door mount portion 20 in the adequate flexed deformation state, thereby adequately enhancing the sealing between the seal piece 46 and the door mount portion 20.

Even when curved portions, or recessed or protruding portions are present on the outer surface of the door mount portion 20 due to the design shape, molding deformation, thermal deformation and the like of the instrument panel 10, the flexible seal piece 46 deforms to follow up the outer shape of the outer surface. Even if the shape of the outer surface of the door mount portion 20 is slightly changed, therefore, the close contact of the seal piece 46 to the door mount portion 20 is secured, so that the adequate sealed state is always achieved.

Figure 7:
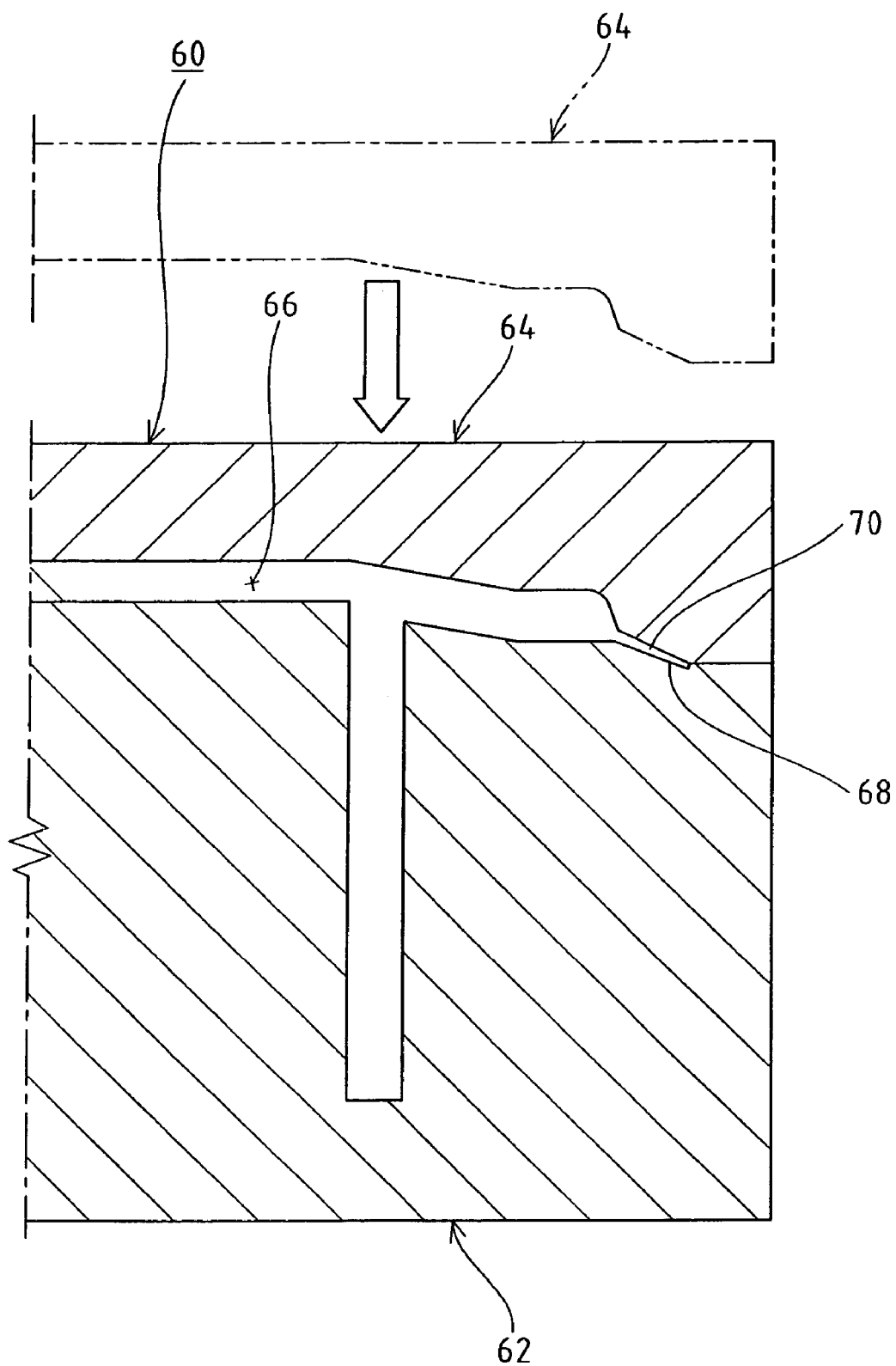
FIG. 7 is a partly cross-sectional view of an injection mold for molding an airbag door having a seal piece provided integrally at the outer contour edge.
Figure 13:
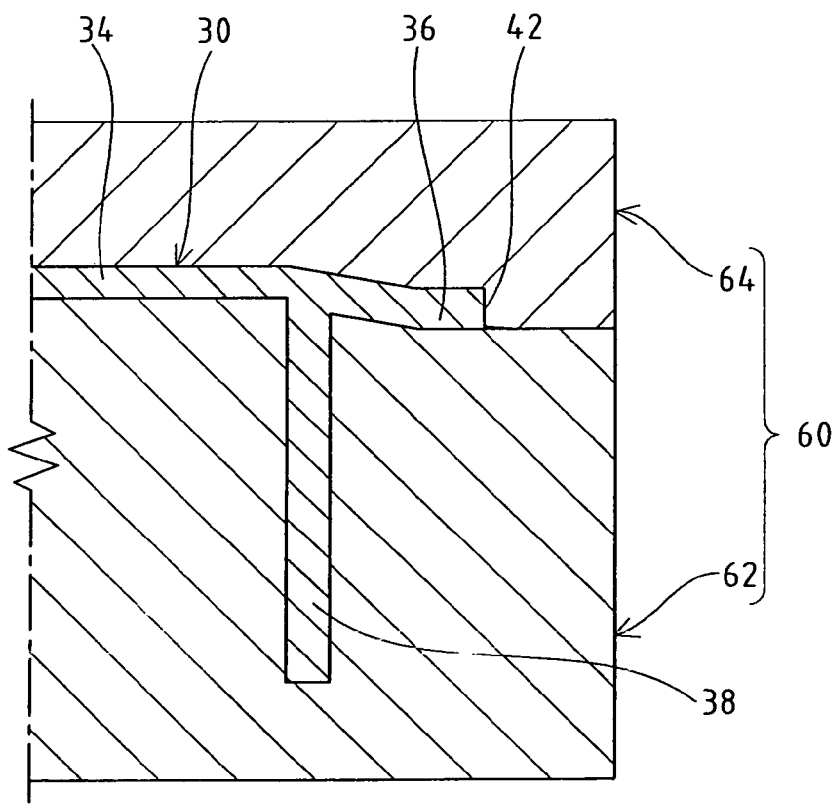
FIG. 13 is a partly cross-sectional view of an injection mold, illustrating the conventional airbag door exemplified in FIG. 11 being molded.

The seal piece 46 can be formed integral with the airbag door 30 by a slight improvement on a conventional injection mold 60 (FIG. 13) for molding the airbag door 30. As shown in FIG. 7, as a recess 68 of a required width is provided along a cavity 66 at the abutment surface of a first mold 62 of the injection mold 60, a clearance 70 which communicates with the cavity 66 to permit entry of a resin material is defined between the abutment surfaces of the first mold 62 and the second mold 64 when both molds 62 and 64 are closed. When the airbag door 30 is molded by the injection mold 60, therefore, a part of the resin material injected into the cavity 66 enters the clearance 70 and is hardened, so that the seal piece 46 is formed integral with the outer contour edge 42 of the airbag door 30. In other words, it can be said that the seal piece 46 is a burr, which is intentionally formed by changing the way of thinking and should be avoided as much as possible according to the prior art.

Figure 6:
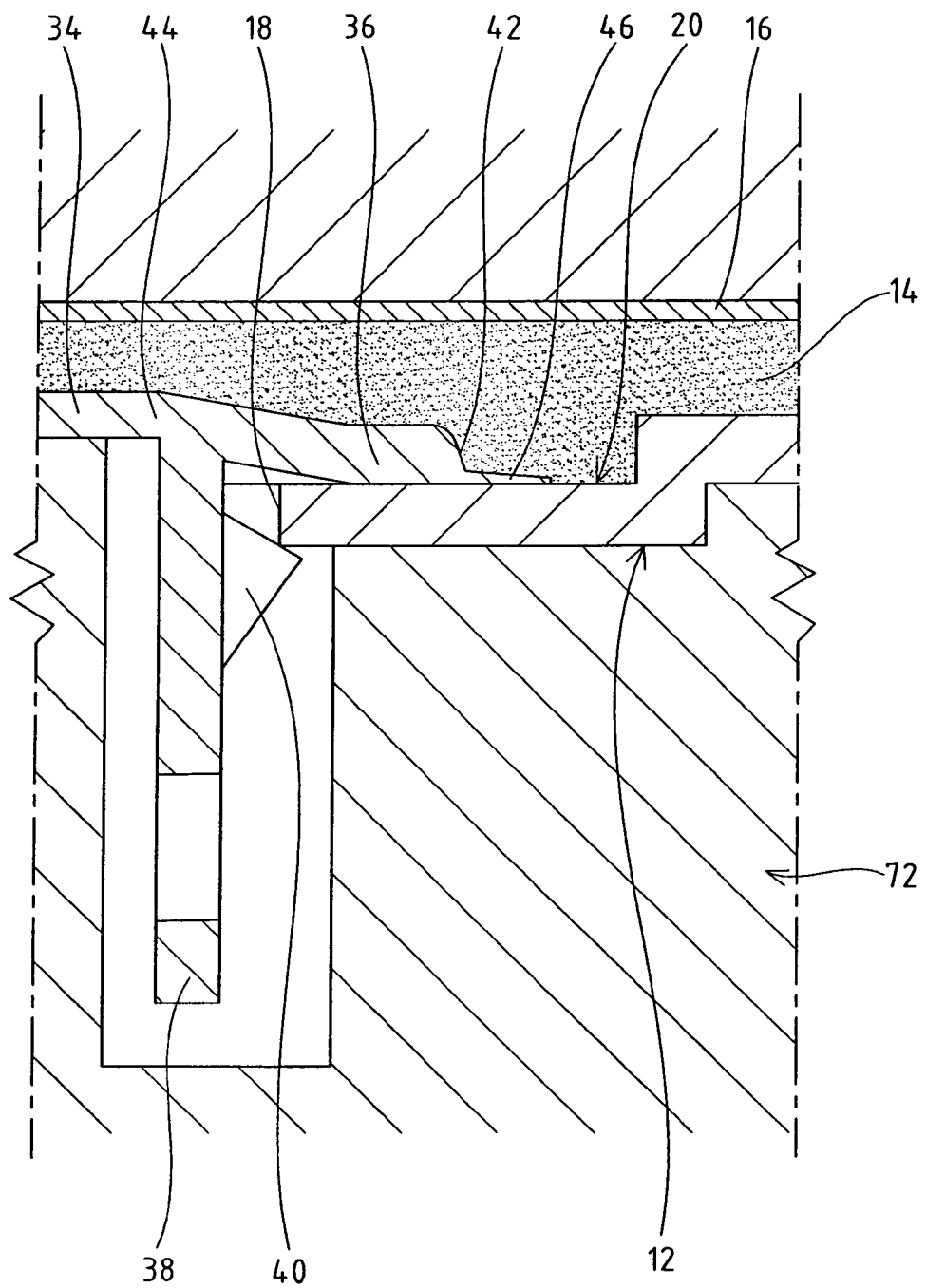
FIG. 6 is an explanatory cross-sectional view showing foaming of the foamed body on the top surface sides of the base material and the airbag door mounted to the base material and illustrating that the foamed body during foaming does not enter between the abutment surfaces of the base material and the airbag door because of a seal piece provided at the outer contour edge of the airbag door.

According to the instrument panel 10 of the embodiment, the seal piece 46 provided at the airbag door 30 is set in close contact with the outer surface of the door mount portion 20 which surrounds the opening 18, provided in the base material 12, when the airbag door 30 is laid at the base material 12, thereby adequately providing the sealing between the base material 12 and the airbag door 30 under which state the foamed body 14 is foamed on the top surface sides of the base material 12 and the airbag door 30. As shown in FIG. 6, therefore, when the foamed body 14 is foamed using a foamed body mold 72, the foamed body 14 being foamed is inhibited from entering the clearance formed between the abutment surfaces of the base material 12 (the outer surface of the door mount portion 20) and the airbag door 30 (the back of the door attaching portion 36), and the undesirable leakage of the foamed body 14 to the back of the base material 12 through the opening 18 can be prevented. Accordingly, the inconvenience shown in FIG. 10 where corresponding portions of the skin 16 are deformed into recesses does not occur, so that the degrading of the texture of the instrument panel 10 can be avoided.

Figure 12:
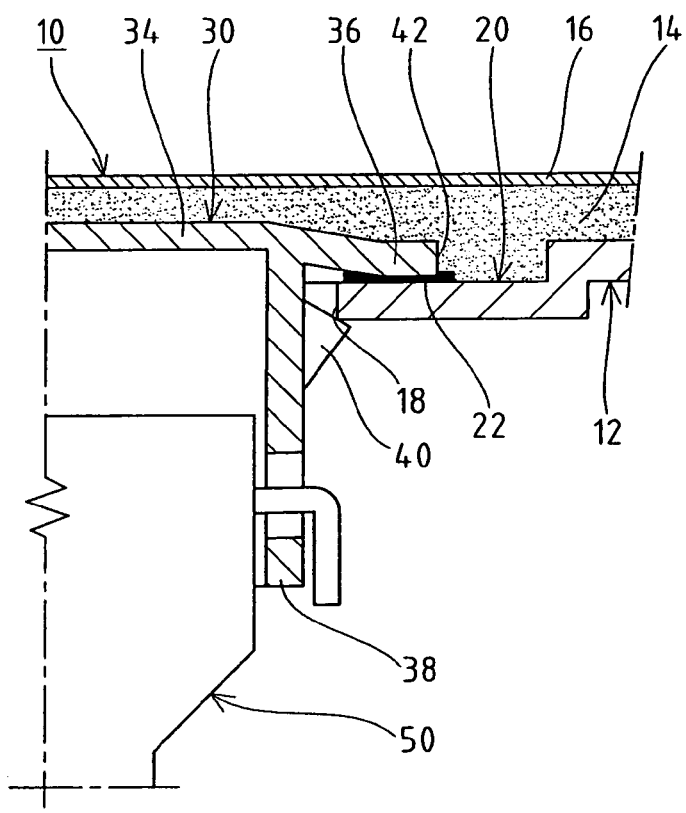
FIG. 12 is an explanatory cross-sectional view exemplifying a technique of preventing leakage of a foamed body toward the back of a base material with a seal piece intervened between the abutment surfaces of the base material and the airbag door.

As the seal piece 46 is formed of a part of the resin material for the airbag door 30 at the same time as the airbag door 30 is formed, the forming of the seal piece 46 does not increase the molding cost. Further, as the seal piece 46 is formed in a thin eaves shape, the amount of the resin material used for the seal piece 46 can be small, thereby minimizing an increase in the molding cost originated from an increase in the amount of the resin material. Because the seal piece 22 shown in FIG. 12 is unnecessary, the cost that is equivalent to the number of work steps and work time for laying the seal member 22 can be reduced.

Further, because a burr which may be formed at the time of injection molding is formed intentionally as mentioned above, the burr cutaway work (preprocess to the foaming of foamed body 14) after molding, which is required according to the prior art, is quite unnecessary so that the cost equivalent to the burr cutaway work can be reduced. Because the thickness S, the extending length L, the shape and the like of the seal piece 46 can be set freely by changing the shape of the recess 68 formed in the injection mold 60, the desired shape and size to ensure the sealed state can be set easily in consideration of the shape of the outer surface of the door mount portion 20. The seal piece 46 can not only change its thickness S and extending length L partly, but also can be formed continuously or intermittently over the perimeter of the airbag door 30.

Although the seal piece 46 extending outward in an eaves form over the perimeter of the outer contour edge 42 of the airbag door 30 is illustrated in the foregoing description of the embodiment as extending and inclined downward at an inclination angle R=15 to 20° with respect to the extension line M toward the abutment surface of the airbag door 30, the extension is not limited to that direction alone, but may be set in approximately the same direction as that of the extension line M (inclination angle R=0°). With the extending direction of the seal piece 46 set this way, the seal piece 46 hardly deforms when the airbag door 30 is mounted to the door mount portion 20, but is pressed against the outer surface of the door mount portion 20 by the foaming pressure at the time of foaming the foamed body 14, so that the sealing between the seal piece 46 and the door mount portion 20 is adequately provided.

Although the seal piece 46 is formed integral with the airbag door 30 formed of a flexible resin material such as TPO in the embodiment, the material for the airbag door 30 is not limited to the resin material. For example, the seal piece 46 can be adequately formed of a slightly hard material. Even when the seal piece 46 is formed of a slightly hard material, it is formed thin, so that with the airbag door 30 completely mounted to the door mount portion 20, the seal piece 46 is set in close contact with the outer surface of the door mount portion 20 while being bent adequately with its proximal end as the bending center, enhancing the sealing between the seal piece 46 and the door mount portion 20.

Although the instrument panel is illustrated as a molded member with a foamed body in the foregoing description of the embodiment, the molded member with a foamed body according to the invention is not limited to this instrument panel, but all molded members with a foamed body which are formed by foaming a foamed body on the top surface sides of the first member and the second member laid at the first member are included in possible molded members of the invention.

According to the molded member with a foamed body of the invention, as discussed above, the seal piece provided at the second member is set in close contact with the outer surface of the first member which surrounds the opening, provided in the first member, when the second member is laid at the first member, thereby providing the sealing between the first member and the second member under which state the foamed body is foamed on the top surface sides of both members. This brings about advantages such that the foamed body being foamed is inhibited from entering the clearance formed between the abutment surfaces of the first member and the second member, and the undesirable leakage of the foamed body to the back of the base material can be prevented.

As the seal piece is formed of a part of the resin material for the second member at the same time as the second member is formed, the forming of the seal piece hardly increases the molding cost. Because the seal piece is formed in a thin eaves shape, the amount of the resin material used for the seal piece can be small, thereby minimizing an increase in the molding cost originated from an increase in the amount of the resin material. Further, the preprocess of the second member prior to the foaming of the foamed body is unnecessary, thus contributing to favorable cost reduction.

What is claimed is:

1. A molded member with a foamed body, comprising:
    a first member with an opening of a required shape;
    a second member provided on a top surface side of said first member to completely cover said opening;
    a foamed body on top surface sides of said first member and said second member and provided in close contact with said first and second members; and
    a thin and flexible seal piece of a required width provided at an outer contour edge of said second member and extending outward over a perimeter thereof in an eaves form,
    wherein said sealed piece is formed to incline, before said second member is laid out at said first member, toward said first member side by a required inclination angle with respect to an extension line which is in a direction of an abutment surface of said second member, said abutment surface coming into contact with the first member, and said seal piece has flexibility that is sufficient to allow a tip end thereof to make upward flexing or bending deformation and come in close contact with an outer surface of said first member, when said second member is laid out at said first member, in response to a shape of the outer surface of said first member which surrounds said opening of said first member.

2. The molded member with a foamed body according to claim 1, wherein said molded member is an instrument panel, said first member is a base material constituting said instrument panel, and said second member is an airbag door to be attached to said opening formed in said base material.

3. The molded member with a foamed body according to claim 1, wherein said seal piece is formed so as to become gradually thinner toward a distal end thereof from a proximal end thereof.

* * * * *